US008096485B2

(12) United States Patent
Hlousek et al.

(10) Patent No.: US 8,096,485 B2
(45) Date of Patent: Jan. 17, 2012

(54) METHOD OF PREHEATING INJECTORS OF INTERNAL COMBUSTION ENGINES

(75) Inventors: Jaroslav Hlousek, Golling (AT); Gerhard Rehbichler, Taxenbach (AT); Johannes Schnedt, Salzburg (AT)

(73) Assignee: Robert Bosch GmbH, Stuttgart-Feuerbach (DE)

(*) Notice: Subject to any disclaimer, the term of this patent is extended or adjusted under 35 U.S.C. 154(b) by 430 days.

(21) Appl. No.: 12/226,015

(22) PCT Filed: Feb. 16, 2007

(86) PCT No.: PCT/AT2007/000086

§ 371 (c)(1), (2), (4) Date: Oct. 3, 2008

(87) PCT Pub. No.: WO2007/112462

PCT Pub. Date: Oct. 11, 2007

(65) Prior Publication Data

US 2009/0145491 A1 Jun. 11, 2009

(30) Foreign Application Priority Data

Apr. 3, 2006 (AT) ................................ A 569/2006

(51) Int. Cl.

| | |
|---|---|
| ***B05B 17/04*** | (2006.01) |
| ***F02M 51/00*** | (2006.01) |
| ***F02M 51/06*** | (2006.01) |
| ***F16K 31/02*** | (2006.01) |

(52) U.S. Cl. ................ 239/13; 239/5; 239/75; 239/135; 239/585.1; 251/129.04; 251/129.15

(58) Field of Classification Search ................ 239/5, 13, 239/67, 69, 75, 128, 135, 533.2, 533.3, 533.9, 239/585.1–585.5; 123/179.15, 472, 549; 251/129.01, 129.04, 129.05, 129.15
See application file for complete search history.

(56) References Cited

U.S. PATENT DOCUMENTS

| | | | | |
|---|---|---|---|---|
| 4,870,932 | A * | 10/1989 | Asmus | 123/179.21 |
| 5,201,341 | A | 4/1993 | Saito et al. | |
| 5,915,626 | A * | 6/1999 | Awarzamani et al. | 239/135 |
| 6,651,602 | B2 * | 11/2003 | Hiraku et al. | 123/179.21 |
| 6,688,533 | B2 * | 2/2004 | Nines et al. | 239/5 |
| 2007/0200006 | A1 * | 8/2007 | Czimmek | 239/5 |

FOREIGN PATENT DOCUMENTS

| | | |
|---|---|---|
| DE | 44 31 189 | 3/1996 |
| DE | 100 31 852 | 1/2002 |
| DE | 101 00 375 | 7/2002 |
| DE | 101 36 049 | 2/2003 |
| GB | 2307513 | 5/1997 |
| JP | 08-014123 | 1/1996 |

* cited by examiner

*Primary Examiner* — Darren W Gorman

(74) *Attorney, Agent, or Firm* — Fitch, Even, Tabin & Flannery

(57) ABSTRACT

In a method and device for preheating an internal combustion engine injector (1) including at least one valve (3) to be activated by an electromagnet (21), in which the coil of the electromagnet (21) is energized before the engine is started, the coil of the electromagnet (21) is periodically powered with a preheating voltage (42), and the current characteristic (33) within the coil is monitored and subjected to an evaluation to detect local current minima (43) and/or maxima (44) caused by armature reactions.

16 Claims, 5 Drawing Sheets

U
I
t
28
29
30
31
32
33
34
35
36
37
38 t
t
t
t
U
I
30
41
30
41
39
40
42
34
45
33
43
44
43
44
44
43
30
41

METHOD OF PREHEATING INJECTORS OF INTERNAL COMBUSTION ENGINES

CROSS-REFERENCE TO RELATED APPLICATIONS

This is a U.S. National Phase of International Application PCT/AT2007/000087, filed Feb. 16, 2007 and claims the benefit of foreign priority under 35 U.S.C. §119 of Austrian Patent Application A 569/2006, filed Apr. 3, 2006, the entire disclosures of which are hereby incorporated by reference herein.

FIELD OF THE INVENTION

The invention relates to a method and device for preheating an internal combustion engine injector including at least one valve to be activated by an electromagnet, in which the coil of the electromagnet is energized before the engine is started.

BACKGROUND OF THE INVENTION

Basically, an injector for an injection system, in particular a common-rail diesel injection system, is comprised of several parts which, as a rule, are held together by a nozzle clamping nut. In the body of the injector nozzle itself, a nozzle needle is guided in a longitudinally displaceable manner, which nozzle needle has several open spaces via which fuel is able to flow from the nozzle prechamber to the tip of the nozzle needle. As a rule, a sealing seat is provided on the tip of the nozzle needle to prevent fuel from reaching the combustion chamber when the nozzle needle is closed. The nozzle needle, on its periphery, comprises a collar on which a pressure spring is supported, which acts closingly on the nozzle needle. The nozzle needle end opposite the tip of the nozzle needle opens into a control chamber that can be powered with pressurized fuel. To this control chamber can be connected at least one inlet channel and at least one outlet channel. All of the connected channels may each comprise at least one throttling point. The pressure within the control chamber is controllable by a control valve which, in most cases, is actuated by an electromagnet. When the valve is actuated, fuel can flow out of the control chamber, thus lowering the pressure in the same. Below an adjustable control chamber pressure, the fuel pressure exerted on the sealing seat will open the nozzle needle, thus causing fuel to be injected into the combustion chamber through at least one injection hole. The flow rates through the individual channels, which are provided with throttles, determine the opening and closing speeds of the nozzle needle.

If an injector of this type is operated with highly viscous fuels—e.g. heavy oil—, it may be necessary to heat the fuel in order to achieve the required injection viscosity. It is, therefore, common, when using such fuels, to flush the injection system with a second fuel of lower viscosity—e.g. diesel oil—before stopping the engine. This helps to prevent highly viscous fuel from cooling down in the injector and affecting, or even rendering impossible, the function of the injection system during the start of the engine.

U.S. Pat. No. 5,201,341 A shows and describes an electromagnetic valve for controlling a fluid flow, as may be used in fuel injectors, in which the fuel to be heated is heated by a fluctuating magnetic field generated by the coil of an electromagnet.

DE 10100375 A1 shows and describes a method for operating a heating oil burner including an atomizing means comprising a nozzle assembly through which heating oil flows and which can be heated by electric energy, in which the heating energy for heating the heating oil is introduced by the appropriate energization of the actuator coil of a magnetic valve. In that method, heating is effected by the current fed to the actuator both during the magnetic-valve operation phase and during the warm-up phase with the magnetic valve closed.

From DE 10136049 A1, a method for heating fuel in a fuel injector comprising one or several magnetic coils has become known, wherein the magnetic coil of the injector of a fuel injector is utilized for heating the fuel. The method proposed in that document is applicable both to fuel injectors including single-coil magnetic assemblies and to fuel injectors comprising double-coil magnetic assemblies, for activating the fuel injection valves. The magnetic coil provided on the fuel injector in those cases is operated as a heating element so as to enable, on the one hand, the saving of an additional heating element and, hence, of costs and structural space, and, on the other hand, due to the arrangement of the magnetic coils within the fuel injector, the rapid heating of the injector body and, hence, the rapid heating of the fuel volume supplied from a fuel delivery installation or a high-pressure collection chamber.

From DE 4431189 A1, a method for preheating the fuel for an internal combustion engine is known, in which, in the event of cold fuel, the electric power loss of the electrical actuation is increased by the aid of an electrically operated injection valve for the fuel and its waste heat is used for preheating the fuel. By the aid of the proposed method, it is recommended, as a substitution for separate electrical heating elements in engines having electrically or electromagnetically operated injection nozzles, to feed the thermal energy for heating the fuel by artificially increasing the energy supply to the electrical or electromagnetic valve actuation of the injection valves. This may, for instance, be realized in that an electrical contact is closed during the opening of the vehicle door, which electrical contact allows electrical current to flow through the windings of injection nozzles as a function of the ambient and coolant temperatures over a defined time, or until a defined fuel temperature is reached. In doing so, it is ensured that no fuel is yet reaching injection despite those measures.

However, the method known from DE 4431189 A1 does in no way guarantee that also highly viscous fuels such as, e.g. heavy oil, will be sufficiently heated so as to induce the viscosity reduction required for injection. There is, in particular, no control as to whether the heating of the injector has actually led to the desired result, i.e., that the valve closing member is freely movable without being impeded by viscous heavy oil.

SUMMARY OF THE INVENTION

Departing from DE 4431189 A1, the present invention, therefore, aims to provide a method for preheating an injection system, which is also suitable for injectors operated with highly viscous fuels such as, for instance, heavy oil, and which allows for the control of the heating time and heating temperature so as to ensure that heating will be effected until an unimpaired operating state is achieved.

General aspects of the present invention, relate to a method and a device for preheating an internal combustion engine injector. A device includes at least one valve to be activated by an electromagnet, in which the coil of the electromagnet is energized before the engine is started, the coil of the electromagnet is periodically powered with a preheating voltage, and the current characteristic within the coil is monitored and subjected to an evaluation to detect local current minima and/or maxima caused by armature reactions.

Aspects of the present invention therefore include:

A method for preheating an internal combustion engine injector including at least one valve to be activated by an electromagnet, in which the coil of the electromagnet is energized before the engine is started, is characterized in that the coil of the electromagnet is periodically powered with a preheating voltage, and that the current characteristic within the coil is monitored and subjected to an evaluation to detect local current minima and/or maxima caused by armature reactions.

In another aspect the coil of the electromagnet is periodically alternately powered with a preheating voltage and short-circuited.

In another aspect the preheating voltage is selected such that the valve closing member is moved before the current in the coil reaches a saturation level.

In another aspect the preheating voltage is selected such that the valve closing member reaches its maximum stroke before the current in the coil reaches a saturation level.

In another aspect the time interval between the powering of the coil with the preheating voltage and the occurrence of a current minimum caused by the armature reaction is measured, and the periodic powering of the coil is terminated as soon as the measured time interval has dropped below a defined setpoint.

In another aspect the time interval between the short-circuit of the coil and the occurrence of a current maximum caused by the armature reaction is measured, and the periodic powering of the coil is terminated as soon as the measured time interval has dropped below a defined setpoint.

In another aspect the temperature of the coil is monitored and the time intervals between the energization periods are controlled as a function of the temperature.

In another aspect the temperature is calculated from the resistance of the coil.

In one of its aspects, a device for preheating an internal combustion engine injector includes at least one valve (3) to be activated by an electromagnet, in particular for carrying out a method for preheating an interval combustion engine injector including a control device for energizing the coil of the electromagnet, wherein the control device is configured for the periodic energization of the coil of the electromagnet with a preheating voltage and an evaluation device is provided, in which the current characteristic within the coil is monitored and subjected to an evaluation for the detection of local current minima and/or maxima caused by armature reactions.

In an aspect of the device in that the control device is configured such that the coil of the electromagnet periodically is alternately powered with a preheating voltage and short-circuited.

In an aspect of the device, the preheating voltage is selected such that the valve closing member is moved before the current in the coil reaches a saturation level.

In an aspect of the device, the preheating voltage is selected such that the valve closing member reaches its maximum stroke before the current in the coil reaches a saturation level.

In an aspect of the device the evaluation circuit is configured to measure the time interval between the powering of the coil with the preheating voltage and the occurrence of a current minimum caused by the armature reaction, wherein the periodic powering of the coil is terminated as soon as the measured time interval has dropped below a defined setpoint.

In an aspect of the device the evaluation circuit is configured to measure the time interval between the short-circuit of the coil and the occurrence of a current maximum caused by the armature reaction, wherein the periodic powering of the coil is terminated as soon as the measured time interval has dropped below a defined setpoint.

In an aspect of the device, the control device comprises means for detecting the temperature of the coil, and the time intervals between the energization periods are controlled as a function of the temperature.

In an aspect of the device, the means for detecting the temperature comprises resistance measuring means, wherein the temperature is calculated from the resistance of the coil.

BRIEF DESCRIPTION OF THE FIGURES

Aspects of the present invention are schematically illustrated with reference to an exemplary embodiment.

DETAILED DESCRIPTION OF THE INVENTION

Figure 1:
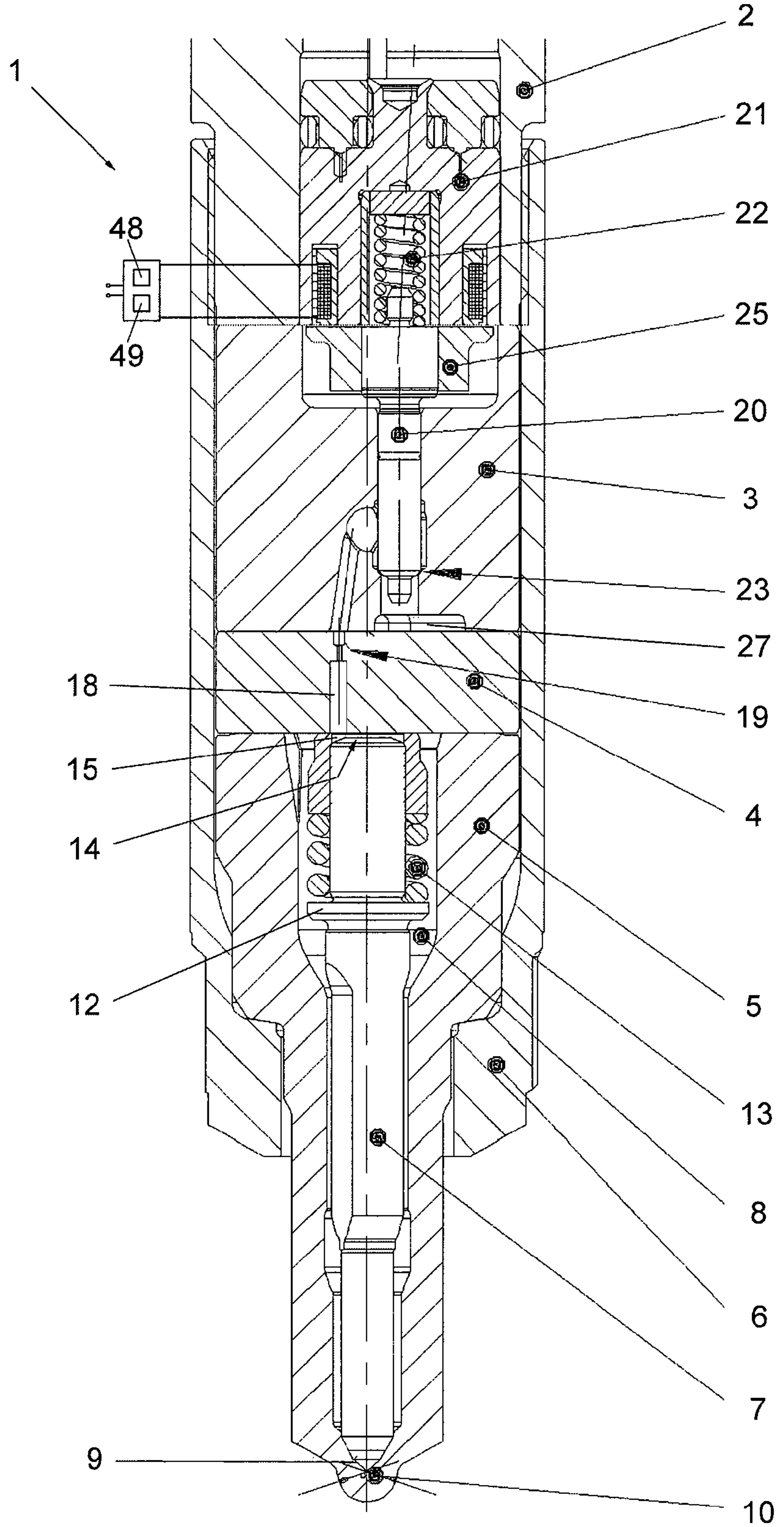
FIGS. 1 and 2 illustrate the basic structure of an injector according to the prior art.

A method according to the invention is essentially characterized in that the coil of the electromagnet is periodically powered with a preheating voltage, and that the current characteristic within the coil is monitored and subjected to an evaluation to detect local current minima and/or maxima caused by armature reactions. Such a mode of procedure enables the monitoring of any of the periodically effected energization procedures as to whether the preheating of the injector has already resulted in such a viscosity reduction that the valve closing member of the magnetic valve is freely movable. The mobility of the valve closing member in this case is recognized from the armature reactions, which armature reactions are detectable by local current minima and/or maxima. Based on this, a precise control of the heating procedure is enabled while overheating is simultaneously avoided. Following each of the periodically effected energization procedures, the electromagnet is preferably short-circuited, and it is consequently provided according to a preferred mode of procedure that the coil of the electromagnet periodically is alternately powered with a preheating voltage and short-circuited.

In order to safeguard that the mobility of the valve closing member is detectable based on the armature reactions, the preheating voltage is advantageously selected such that the valve closing member is being moved before the current in the coil reaches a saturation level. An even more precise control will be achieved if the preheating voltage is selected such that the valve closing member reaches its maximum stroke before the current in the coil reaches a saturation level. When selecting such a preheating voltage, it is feasible, by observing the current in the coil, to determine at what time the mobility of the valve closing member has reached such a level that the maximum stroke can be traveled, thus providing a regular mode of operation of the injector.

In order to ensure sufficient dynamics of the valve closing member, it is preferably proceeded in a manner that the time interval between the powering of the coil with the preheating voltage and the occurrence of a current minimum caused by the armature reaction is measured, and the periodic powering of the coil is terminated as soon as the measured time interval has dropped below a defined setpoint. The detection of the time interval between the powering of the coil with the preheating voltage and the occurrence of a current minimum in the current of the coil allows for performing preheating until the reduction of the viscosity of the fuel, in particular heavy oil, results in a sufficiently rapid actuation and, in particular, a sufficiently rapid opening of the valve closing member. As far as the closing procedure of the valve closing member is concerned, a sufficiently high speed of this closing procedure will be detected if it is preferably proceeded in a manner that the time interval between the short-circuit of the coil and the occurrence of a current maximum caused by the armature reaction is measured, and the periodic powering of the coil is terminated as soon as the measured time interval has dropped below a defined setpoint.

In order to prevent overheating of the coil by too quick a succession of the periodically initiated powering procedures, it is preferably proceeded in a manner that the temperature of the coil is monitored and the time intervals between the energization periods are controlled as a function of the temperature. In doing so, the temperature of the coil is calculated from the resistance of the coil in a simple manner.

Figure 2:
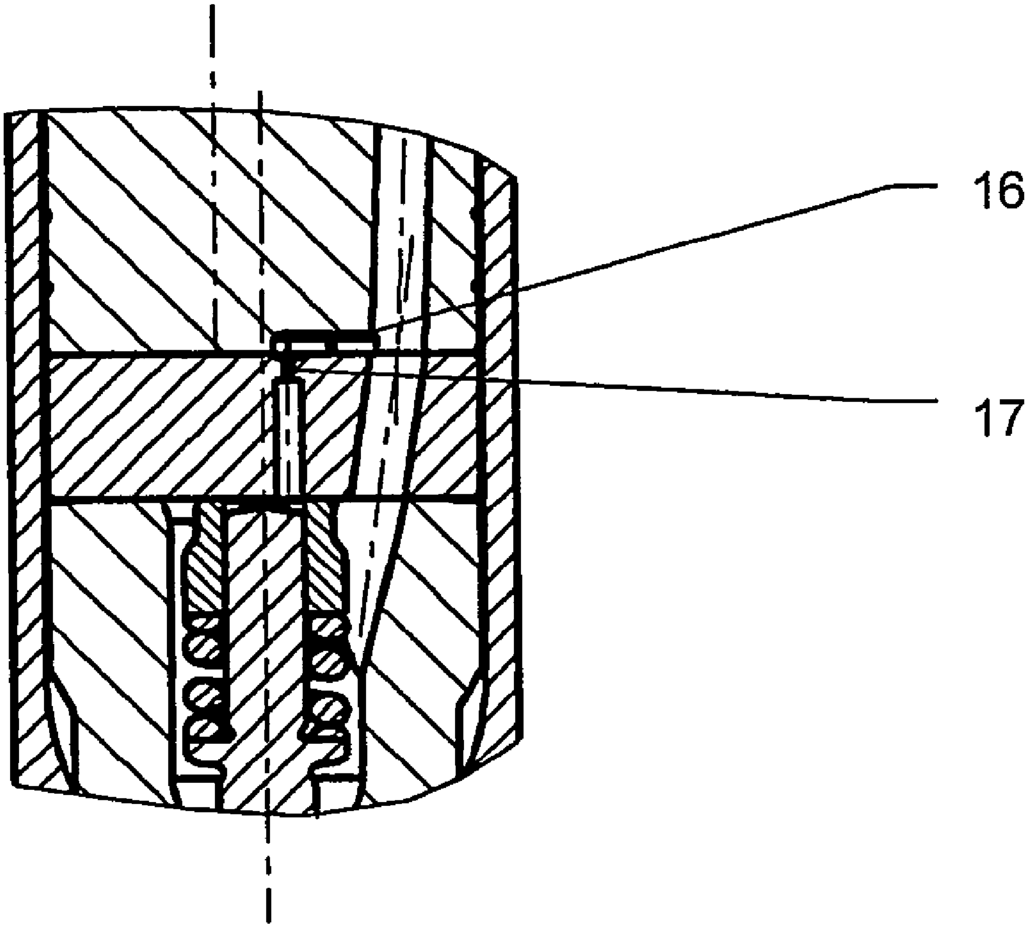

FIGS. 1 and 2 depict an injector 1, which comprises an injector body 2, a valve array or valve 3, an intermediate plate 4, an injector nozzle 5 and nozzle clamping nut 6. The injector nozzle 5 comprises a nozzle needle 7, which is guided in a longitudinally displaceable manner within the injector nozzle 5 and has several open spaces to enable fuel to flow from the nozzle prechamber 8 to the tip 9 of the nozzle needle. When the nozzle needle 7 is opened, fuel is injected into the combustion chamber 11 via at least one injection hole 10. The nozzle needle 7, about its periphery, comprises a collar 12 to support a compression spring 13 exerting a closing force on the nozzle needle 7. The nozzle needle 7, on its side located opposite the tip 9 of nozzle needle, terminates by an end face 14 ending in a control chamber 15. The control chamber 15 comprises a supply channel 16 including a supply throttle 17, and a discharge channel 18 including a discharge throttle 19. The flow volumes through the supply channel 16 and the discharge channel 18 are dimensioned such that the pressure adjusting in the control chamber 15 is so small that the nozzle needle 7 will be opened by the fuel pressure prevailing in the nozzle prechamber 8, both against the pressure of the compression spring 13 and against the pressure in the control chamber 15. When the discharge channel 18 is closed, the pressure in the control chamber 15 exerts a force acting on the end face 14 and closing the nozzle needle 7. The opening and closing speeds of the nozzle needle 7 can be adjusted by selecting the throttle diameters in a suitable manner. The discharge channel 18 is closed by a valve needle 20, which is axially movable within the valve array 3. The valve needle 20 is pressed by a valve spring 22 into the valve seat, which is designed as a sealing cone. When energizing the electromagnet 21, the valve seat 23 is released by the electromagnet 21 attracting the armature 25 and, hence, moving the valve needle 20 connected with the armature 25 and the pressurized fuel flows from the discharge channel 18 into the low-pressure chamber 27. A control device is shown connected to an evaluation device, see 48 and 49.

Figure 3:
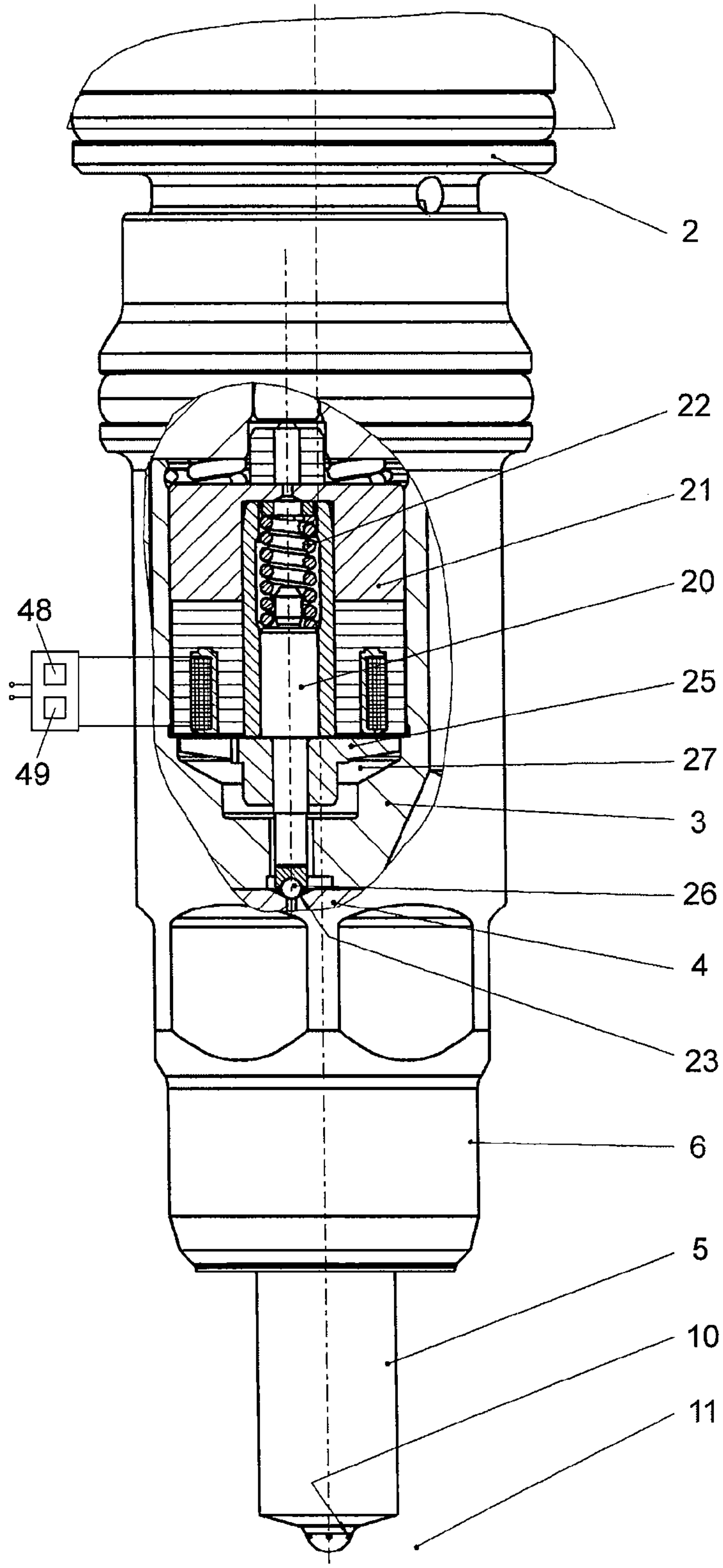
FIG. 3 depicts a variant configuration of the valve array for controlling the nozzle needle.

FIG. 3 illustrates a second possible configuration of the valve array 3. The discharge channel 18 opens directly at the valve seat 23, which is closed by a valve ball 26. The valve ball 26 is pressed into the valve seat 23 by a valve spring 22. When energizing the electromagnet 21, the latter attracts the armature 25 connected with the valve needle 20, the valve seat 23 is opened, and the pressurized fuel flows from the discharge channel 18 into the low-pressure chamber 27.

Figures 4A, 4B:
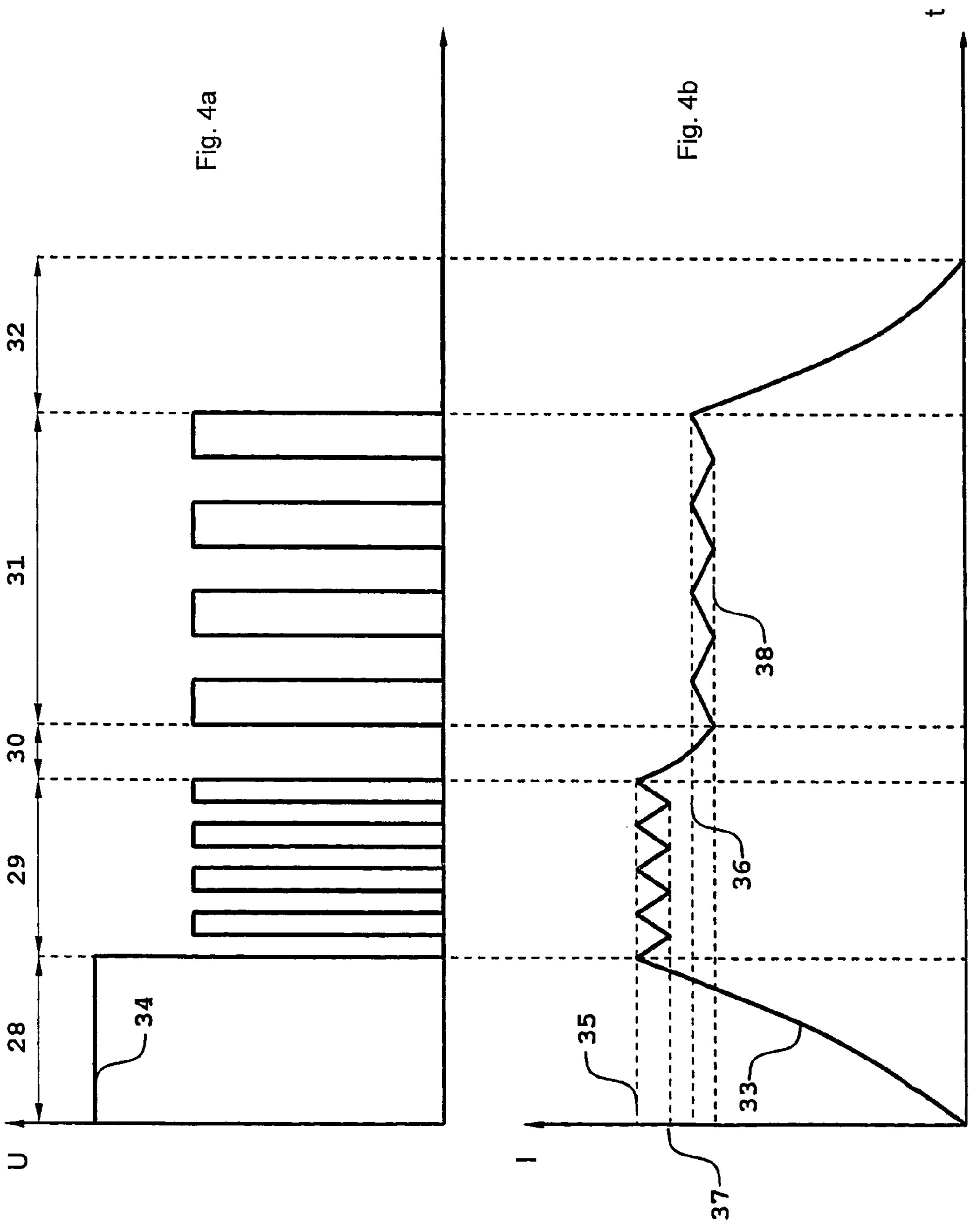
FIG. 4 shows an example of the current-voltage characteristic within the coil of the magnetic valve during the injection procedure.

FIG. 4 shows the typical characteristic of a current 33 and a voltage 34, respectively, within the winding of the electromagnet 21. The activation for the injection operation is characterized in that, during an acceleration period 28, the current through the electromagnet 21 increases monotonously until reaching the upper limit value of the attraction current 35. In the subsequent attraction current phase 29, during which the armature 25 is moving against the force of the valve spring 22 on account of the magnetic force caused by the electromagnet 21, the current through the electromagnet 21 is held between the upper limit value of the attraction current 35 and the lower limit value of the attraction current 37 by the aid of a two-point current control. Upon opening of the valve array 3, the current through the electromagnet 21 drops to the lower limit value of the holding current in the free-running phase 30. Until the end of the subsequent holding current phase 31, the current through the electromagnet 21 is held between the upper limit value of the hold current 36 and the lower limit value of the hold current 38 by means of a two-point current control. For closing the valve array 3, the current through the electromagnet 21 is again lowered to zero in the clearing phase 32.

Figures 5A, 5B:
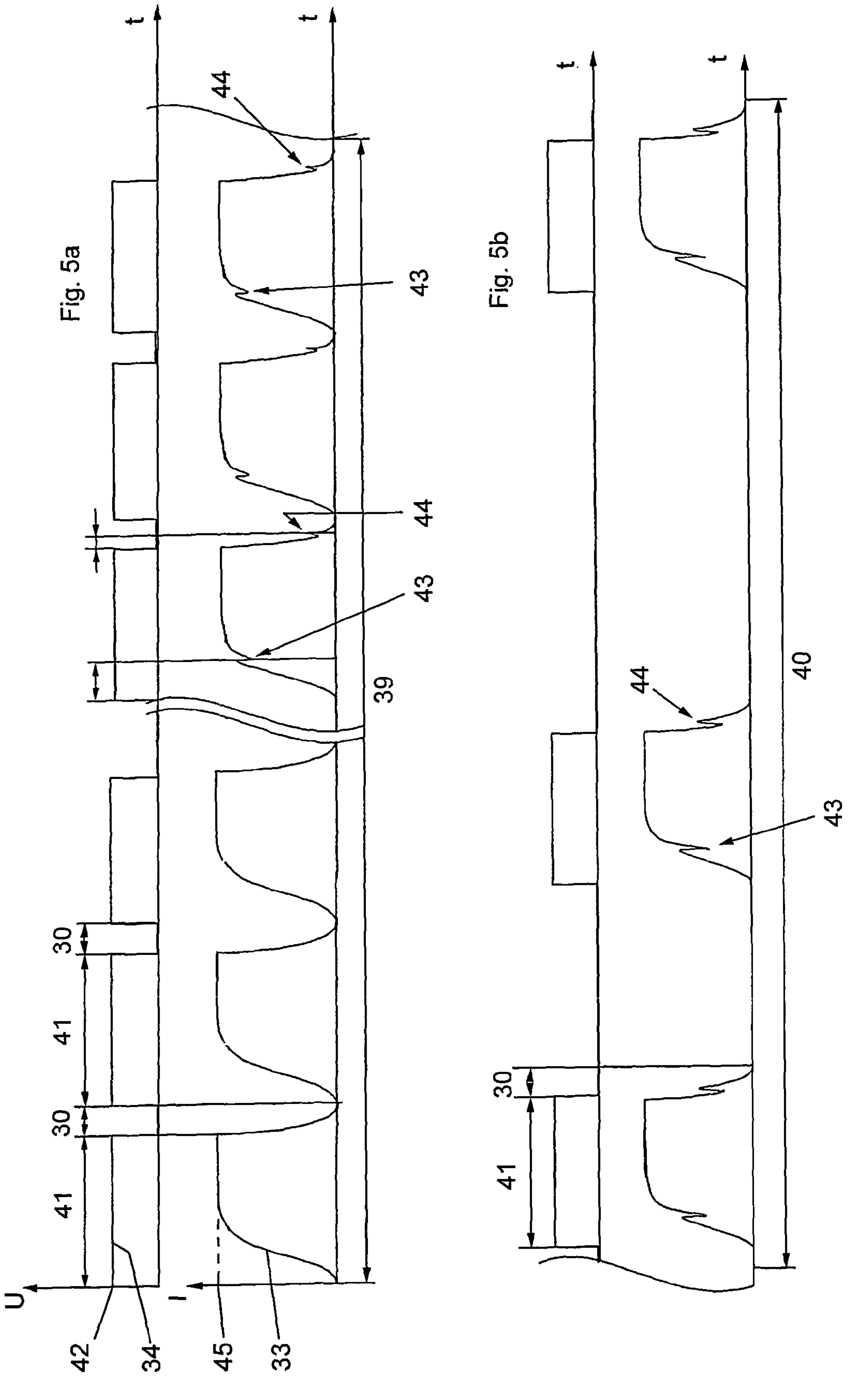
FIG. 5 finally illustrates an option for activating the magnetic valve for preheating the injector, which falls within the scope of the present invention.

In the context of the present invention, a second possible current characteristic will now be defined, by which heating of the valve array 3 is effected by the waste heat produced in the electromagnet 21, without causing damage to the electromagnet 21. The aim of such heating is the reduction of the viscosity of the fuel present in the hollow spaces of the magnetic valve and neighboring assemblies. The current or current characteristic 33 required therefor in the electromagnet 21 is represented in FIG. 5. During the warm-up phase 39, the electromagnet 21 periodically is alternately powered with a preheating voltage 42 for the duration of a heating phase 41 and short-circuited for the duration of the free-running phase, or time interval 30 between the energizing periods. The duration of the heating phase 41 is selected such that the inductivity of the coil in the electromagnet 21 can be neglected. The value of the preheating voltage 42 is selected such that the valve needle 20 reaches its maximum stroke before the current 33 through the electromagnet 21 reaches its saturation level 45. As a result, armature reactions are to be recognized in the characteristic of the current 33 during the opening and closing of the valve needle, as soon as the valve needle 20 has started to move. The temperature of the coil of the electromagnet 21 can be calculated from the known temperature dependence of the electrical resistance. A change in the electrical resistance of the coil is determined by measuring the differences of the voltage and current before and during heating. The warm-up phase is completed as soon as the valve needle 20 is movable and, during the warm-up phase 30, due to the armature reaction, a local current minimum 43 is detected when the valve needle 20 is opened, and a local current maximum 44 is detected when the valve needle 20 is closed. If, however, no armature reactions are yet to be detected during the warm-up phase 39, and the measured resistance is larger than the maximum resistance set-point permitted, i.e. the temperature has reached or exceeded the permissible value, the warm-up phase 39 will be terminated and the temperature control phase 40 will be started. The temperature control phase 40 differs from the warm-up phase 39 in that one or several heating phase 41 and free-running phase 30 cycles are omitted. The number of cycles to be omitted is determined as a function of the deviation of the set resistance from the measured resistance in the electromagnet 21 such that the pregiven temperature will not be exceeded.

The temperature control phase is completed as soon as a local current minimum 43 is detected when the valve needle 20 is opened, and a local current maximum 44 is determined when the valve needle 20 is closed, again based on the armature reactions.

An improvement of the method is possible, if the time interval 46 between the beginning of the energization of the electromagnet 21 and the occurrence of the local current minimum 43, or the time interval 47 between the end of the energization and the occurrence of the local current maximum 44, is additionally determined and the periodic energization of the electromagnet 21 according to the invention is only terminated when the time interval 46 or 47, respectively, has dropped below a setpoint, which means that the nozzle needle has gained sufficient dynamics, i.e. can be opened or closed in a sufficiently rapid manner.

As soon as a local current minimum 43 has, thus, occurred during the heating phase 41, during opening, and a local current maximum 44 has, thus, occurred during the subsequent free-running phase, during closing, and these are within predefined limits in terms of time, it can be concluded therefrom that the valve needle 20 is movable in the valve array 3 so as to allow proper injection. In this case, the changeover from preheating (FIG. 5) to regular activation (FIG. 4) takes place.

The invention claimed is:

1. A method for preheating an internal combustion engine injector including at least one valve to be activated by an electromagnet, in which the coil of the electromagnet is energized before the engine is started, and a valve closing member wherein said method comprises periodically energizing the coil of the electromagnet with a preheating voltage, and monitoring and subjecting the current characteristic within the coil to an evaluation to detect local current minima and/or maxima caused by armature reactions.

2. A method according to claim 1, wherein said periodically energizing the coil of the electromagnet comprises periodically alternately energizing the coil with a preheating voltage and short-circuiting the coil.

3. A method according to claim 1, wherein in said method the preheating voltage is selected such that the valve closing member is moved before the current in the coil reaches a saturation level.

4. A method according to claim 1, wherein in said method the preheating voltage is selected such that the valve closing member reaches its maximum stroke before the current in the coil reaches a saturation level.

5. A method according to claim 1, wherein said method further comprises measuring a time interval between the energizing of the coil with the preheating voltage and the occurrence of a current minimum caused by the armature reaction, and terminating the periodic energizing of the coil is as soon as the measured time interval has dropped below a defined setpoint.

6. A method according to claim 2, wherein said method further comprises measuring a time interval between the short-circuiting of the coil and the occurrence of a current maximum caused by the armature reaction, and terminating the periodic energizing of the coil as soon as the measured time interval has dropped below a defined setpoint.

7. A method according to claim 1, wherein in said method comprises controlling the time intervals between when the coil is energized as a function of the temperature of the coil.

8. A method according to claim 7, wherein said method the temperature of the coil is calculated from a resistance of the coil.

9. A device for preheating an internal combustion engine injector that includes, at least one valve (3) to be activated by an electromagnet and a valve closing member, said device including a control device for energizing a coil of the electromagnet, wherein the control device is configured for periodically energizing the coil of the electromagnet with a preheating voltage, and an evaluation circuit, in which the current characteristic within the coil is monitored and subjected to an evaluation for the detection of local current minima and/or maxima caused by armature reactions.

10. A device according to claim 9, wherein the control device is configured such that the coil of the electromagnet periodically is alternately energized with a preheating voltage and short-circuited.

11. A device according to claim 9, wherein the preheating voltage is selected such that the valve closing member is moved before the current in the coil reaches a saturation level.

12. A device according to claim 9, wherein the preheating voltage is selected such that the valve closing member reaches its maximum stroke before the current in the coil reaches a saturation level.

13. A device according to claim 9, wherein the evaluation circuit is configured to measure a time interval between energizing the coil with the preheating voltage and the occurrence of a current minimum caused by the armature reaction, wherein the periodic energizing of the coil is terminated as soon as the measured time interval has dropped below a defined setpoint.

14. A device according to claim 9, wherein the evaluation circuit is configured to measure a time interval between the short-circuit of the coil and the occurrence of a current maximum caused by the armature reaction, wherein the periodic energizing of the coil is terminated as soon as the measured time interval has dropped below a defined setpoint.

15. A device according to claim 9, wherein the control device comprises means for controlling the time intervals between when the coil is energized are controlled as a function of the temperature of the coil.

16. A device according claim 15, wherein the control device includes means for detecting the temperature of the coil that comprises resistance measuring means, wherein the temperature is calculated from a resistance of the coil.

* * * * *